Patented Jan. 9, 1951

2,537,064

UNITED STATES PATENT OFFICE 2,537,064

TREATMENT OF ORGANIC TEXTILE MATERIALS AND PRODUCTS THEREOF

Edward L. Kropa, Old Greenwich, and Arthur S. Nyquist, Cos Cob, Conn., assignors to American Cyanamid Company, New York, N. Y., a corporation of Maine No Drawing. Application August 30, 1946,
Serial No. 694,157

15 Claims. (Cl. 8—116.2)

This invention relates to the treatment of hydrogen-donor textile materials and to the products thereof. More particularly, the invention is concerned with a process of treating organic, hydrogen-donor textile materials, e. g., protein-containing textile materials, polysaccharide-containing textile materials, etc., to impart improved properties thereto by treating the textile material with a composition comprising a reactive copolymer hereafter more fully identified.

In our copending application Serial No. 694,156 we have described and claimed polymerizable compositions comprising a mixture of (1) a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ has a value which is one of the following: 0, 1, the methylene radical attached to the isocyanate grouping being attached directly, when $n$ is 1, to any carbon atom of the divalent radical represented by A, and (2) a different organic compound which is copolymerizable with the isocyanate of (1), which contains a single $CH_2=C<$ grouping and which is free from a hydrogen atom or atoms reactive with the isocyanate grouping, the proportions of the said ingredients of (1) and (2) in the said mixture being such that the resulting polymerization product contains an average of at least two isocyanate groupings per molecule; and the products (copolymers) obtained by polymerizing such polymerizable compositions.

Illustrative examples of divalent radicals that A in the aforementioned general formula for the primary isocyanate may represent are: ethylene, propylene (trimethylene), butylene, isobutylene, pentylene, isopentylene, hexylene, and other divalent saturated aliphatic hydrocarbon radicals, including divalent saturated cycloaliphatic hydrocarbon radicals, e. g., cyclopentylene, cyclohexylene, cycloheptylene, etc.; phenylene, naphthylene, biphenylene, and other divalent aromatic hydrocarbon radicals; 2,4-tolylene, xylylene, ethyl 2,5-phenylene, propyl 2,4-phenylene, isopropyl 3,4-phenylene, 1-butyl 2,4-naphthylene and other divalent saturated aliphatic-substituted aromatic hydrocarbon radicals; phenylethylene, phenyl- propylene, phenylbutylene, naphthylethylene, naphthylisobutylene, and other divalent aromatic-substituted saturated aliphatic hydrocarbon radicals; as well as radicals that may be classed either as divalent saturated aliphatic-substituted aromatic or divalent aromatic-substituted saturated aliphatic hydrocarbon radicals, e. g., 4,alpha-tolylene, 3,beta-phenylene ethyl, 4,-alpha-xylylene, 2,gamma-phenylenebutyl, etc.

The present invention is based on our discovery that reactive copolymers of the kind described above, more particularly the soluble or dispersible copolymers of the aforementioned ingredients, react with hydrogen-donor textile materials, more particularly organic hydrogen-donor textile materials, to yield products or articles having improved properties as compared with the untreated material and which in many respects are superior to textile materials treated with conventional treating agents in order to improve their properties, e. g., in the case of wool or a wool-containing fabric, such properties as resistance to shrinking and creasing. The isocyanate copolymers used in practicing our invention are essentially non-volatile.

Many organic, hydrogen-donor textile materials, for instance, textiles composed of or containing natural or regenerated proteins, e. g., wool and wool-containing textiles, e. g., loose wool itself, yarns, threads and woven, felted and knitted cloth have a very undesirable tendency to felt and shrink when subjected to ordinary washing operations. The tendency of these wool materials to felt and shrink is due generally to a curling and intertwining of the wool fibers as the fabrics are wetted and subjected to the mechanical movements of the washing processes. As a result, the textile material becomes more closely compacted, thicker and has a considerably reduced area.

A number of different methods have been proposed for the treatment of textile materials formed of or containing wool or other organic hydrogen-donor material in order to prevent or to decrease felting and shrinking. In many cases such reduction in felting and shrinking tendencies has been attained at the sacrifice of some other desirable property of the material. Some treatments damage the fiber and reduce its wearing qualities while others impart an undesirable harshness to the fabric. Other treatments are not permanently effective and may even cause an ultimate increase in shrinkage. Still other shrink-proofing methods are difficult to apply with uniformity and create hazards to the workmen involved in their applications.

It was suggested prior to our invention that copolymers of a 1-alkenyl isocyanate, e. g., vinyl isocyanate, with a vinyl or a vinylidene compound, specifically vinyl acetate, styrene and methyl methacrylate, might be prepared. It was also suggested that solutions of such copolymers be applied to fabrics in order to impart water repellency thereto. However, to the best of our knowledge and belief, it was not known heretofore that isocyanates of the kind represented by the general formula $CH_2=CR-(A)_n-CH_2-NCO$ where R, A, and $n$ have the meanings given in the second paragraph of this specification would yield, upon polymerization with a compound which is copolymerizable therewith, which contains a single $CH_2=C<$ grouping and which is free from a hydrogen atom or atoms reactive with the isocyanate grouping (e. g., alcohols, acids, water, etc.), copolymer compositions which, when applied in solution or dispersed state to an organic hydrogen-donor textile material, more particularly a protein-containing material, e. g., wool or a wool-containing material in yarn, fabric or other form, have the particular and peculiar property of imparting shrinkage resistance thereto, and yet effecting this result with a smaller amount of treating agent than generally is required. For example, when a toluene solution of a soluble copolymer of allyl isocyanate and ethyl acrylate was applied to a piece of woolen goods and the treated goods was heated to evaporate the solvent and to insolubilize the copolymer, the treated cloth even after five launderings showed a shrinkage of only 3.3%. In marked contrast, untreated woolen cloth when similarly laundered for the same number of times showed a shrinkage of 44.5%. It was quite unexpected and unpredictable that isocyanate copolymer compositions of the kind described in the second paragraph of this specification would impart such outstanding shrinkage resistance to an organic textile material, specifically a woolen fabric. Even more surprising was the fact that this shrinkage resistance was imparted to the woolen goods without in any way lessening its softness to the touch, and that these results were obtained by impregnating the woolen fabric with only about 8 to 9% by weight of copolymer, since with most treating materials about 14 to 16% by weight of treating agent, based on the dry weight of the woolen goods, is required in order to impart satisfactory shrinkage resistance thereto.

The improved results obtained with the above-described copolymer compositions are believed to be due to the fact that the linear molecules of the copolymer, which in all cases contains an average of at least two isocyanate groupings per molecule and may contain an average of as many as, for example, 200 or more isocyanate groupings per molecule, react with the fiber molecules of the organic hydrogen-donor textile material, e. g., wool, to form another cross-linked polymer. This new product consists of two linear materials which are interwoven, namely, molecules of the wool fiber joined with molecules of resin. The "soft hand," that is, soft feeling to the touch, is believed to be due to flexible resin linkages between the wool molecules. Usually, when other materials are applied to wool in order to render it shrink-resistant, a harsh finish results due to the fibers of wool becoming drawn together. By using copolymers of the kind hereinbefore described in treating, for example wool, the rubber-like portion of the copolymer molecule, which portion is derived from the acrylic or other monomer copolymerized with the isocyanate, provides flexibility between the wool molecules with the result that the treated wool has a soft hand.

By employing the aforementioned isocyanate copolymer compositions, it is possible to obtain better control of the shrinkage of, for example, wool than is possible by the use of conventional materials. Another advantage is that a lesser amount of treating material than generally is employed produces the desired results. For example, if it is desired to treat cotton or rayon in order to render it shrink-resistant, it is common practice to use approximately 2 to 4% of a conventional resinous material to effect this result. However, if the cotton or rayon material also is to be made crease-resistant, then ordinarily it requires about 8 to 10% of a conventional resin in order to impart this property to the material. In the case of wool, as much as about 16% of conventional treating material may be required in order to provide satisfactory shrinkage and crease control of the woolen fabric.

By using the above-described isocyanate copolymer composition in treating, for example wool, outstanding shrinkage control and also crease control can be effected with the same amount of treating agent with obvious advantages. Furthermore, the same isocyanate copolymer may be applied to textile materials made either of cotton, rayon or wool, or may be applied to mixed fabric materials, for example, textiles made of rayon and cotton, rayon and wool, rayon and regenerated fibers (both cellulosic and protein) and the like. An additional advantage, as previously indicated, is that a lesser amount of treating agent is required as compared with conventional materials.

It is believed that these improved results are due to the fact that the isocyanate copolymers used in practicing our invention contain an isocyanate grouping which is attached to a primary carbon atom. The attachment to the primary carbon atom appears to serve a two-fold function. First, it places the isocyanate grouping sterically off the main polymeric chain, putting it in a position more favorable for chemical reaction with any hydrogen-donor molecule; and secondly, the presence of an isocyanate grouping which is attached to a primary carbon atom renders such a grouping much more chemically reactive with hydrogen-donor materials.

The foregoing explanation is supported by other known facts. For instance, it is commonly known that a primary hydroxyl grouping reacts with a hydrogen-donor material many times faster than a hydroxyl grouping which is attached to a secondary carbon atom. Moreover, hydroxyl groups on tertiary carbon atoms are usually inactive under the same conditions. It also is generally known that almost any resinous material, when applied to a fabric, will impart some degree of finish to the fabric, but it is only in those cases where extensive and complete chemical reaction occurs between the resin and the fabric that one secures a satisfactory degree of both shrinkage and crease resistance.

The isocyanates employed in making the copolymers used in practicing our invention may be prepared, for example, by three general methods: the first involves the reaction of the corresponding alkenyl halide with a metallic isocyanate; the second involves the metathesis of the corresponding alkenyl urea and an isocyanate, which latter may be mono- or polyfunctional; while the third involves the reaction of the corresponding amine with phosgene and the dehydrohalogenation of the corresponding acid chloride thereby obtained.

Since all of the amines used in the preparation of these isocyanates are attached to a primary carbon atom they may be produced by the catalytic reduction of a suitable derivative of the corresponding nitrile. Inasmuch as the reduction of the nitrile to the amine would destroy the final unsaturation, it is necessary to protect this grouping during the reduction. This may be done, for example, by the reduction of the corresponding carbinol derivative of the nitrile and subsequent dehydration and reaction with phosgene. The resulting acid chloride is then dehydrohalogenated to yield the isocyanate.

Illustrative examples of primary isocyanates that may be employed in preparing the copolymers used in practicing the present invention and which are embraced by the general formula

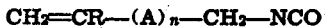

where R, A and $n$ have the meanings hereinbefore given, are listed below:

Allyl isocyanate
Methallyl isocyanate
3-butenyl isocyanate
3-methyl-3-butenyl isocyanate
4-pentenyl isocyanates
4-methyl-4-pentenyl isocyanates
5-hexenyl isocyanates
5-methyl-5-hexenyl isocyanates
10-hendecenyl isocyanates
Vinyl benzyl isocyanates
Isopropenylbenzyl isocyanates
Vinylnaphthylmethyl isocyanates
Isopropenylnaphthylmethyl isocyanates
Vinylbiphenylmethyl isocyanates
Isopropenylbiphenylmethyl isocyanates
2-methyl-3-butenyl isocyanate
2,3-dimethyl-3-butenyl isocyanate
2-phenyl-3-butenyl isocyanate
2-phenyl-3-methyl-3-butenyl isocyanate
2-tolyl-3-butenyl isocyanate
2-tolyl-3-methyl-3-butenyl isocyanate
2-methyl-4-pentenyl isocyanate
2-ethyl-4-methyl-4-pentenyl isocyanate
2-phenyl-4-pentenyl isocyanate
2-tolyl-4-methyl-4-pentenyl isocyanate
Allylbenzyl isocyanates
Methallylbenzyl isocyanates
2-benzyl-3-butenyl isocyanate
2-benzyl-4-methyl-4-pentenyl isocyanate
Vinylcyclopentylmethyl isocyanates
Isopropenylcyclohexylmethyl isocyanates
2,2-dimethyl-3-butenyl isocyanate Illustrative examples of monomeric materials which may be copolymerized with the isocyanates hereinbefore described to produce the copolymers used in practicing this invention are N,N-dialkyl acrylamides, e. g., N,N-dimethyl, -diethyl, -dipropyl, -dibutyl, -dipentyl, -dihexyl, -dioctyl, etc., acrylamides; N-methyl, N-ethyl acrylamide, N-ethyl, N-propyl acrylamide, etc.; the acrylic, α-alkyl acrylic and α-haloacrylic esters of saturated monohydric alcohols, for instance, saturated aliphatic monohydric alcohols, e. g., the methyl, ethyl, propyl, isopropyl, butyl, isobutyl, pentyl, etc., esters of acrylic, methacrylic, ethacrylic, propacrylic, chloroacrylic, bromoacrylic, etc., acids; the phenyl, benzyl, phenlethyl, etc., esters of the aforementioned acids; vinyl aromatic hydrocarbons, for instance styrene and substituted styrenes, e. g., dimethyl styrenes, trimethyl styrenes, ethyl styrenes, methyl ethyl styrenes, chloromethyl styrenes, monochlorostyrene, dichlorostyrenes, cyanostyrenes, etc., vinyl naphthalenes, etc.; other vinyl aromatic compounds, e. g., N-vinyl carbazole, vinyl thiophenes, etc.; the vinyl esters of saturated aliphatic monocarboxylic acids, e. g., vinyl acetate, vinyl propionate, vinyl butyrate, vinyl valerate, etc.; alkyl vinyl ketones, e. g., methyl vinyl ketone, ethyl vinyl ketone, methyl isopropenyl ketone, etc.; itaconic diesters containing a single $CH_2=C<$ grouping, e. g., the dimethyl, diethyl, dipropyl, dibutyl and other saturated aliphatic monohydric alcohol diesters of itaconic acid, diphenyl itaconate, dibenzyl itaconate, di(phenyl-ethyl) itaconate, etc.; allyl and methallyl esters of saturated aliphatic monocarboxylic acids, e. g., allyl and methallyl acetates, allyl and methallyl propionates, allyl and methallyl valerates, etc.; nitriles containing a single $CH_2=C<$ grouping, e. g., acrylonitrile, methacrylonitrile, etc. Mixtures of the aforementioned monomeric materials may be employed, if desired, as well as mixtures of such monomer or monomers with other copolymerizable materials containing a single $CH_2=C<$ grouping. The material which is mixed and polymerized with the isocyanate in all cases should be copolymerizable with the isocyanate, should contain a single $CH_2=C<$ grouping, but should not contain any hydrogen atom or atoms which will react with the isocyanate grouping.

The copolymers used in practicing this invention are prepared by mixing the primary isocyanate with a different organic compound of the kind hereinbefore described, numerous examples of which have previously been given. Examples of the preferred classes of such compounds are the N,N-dialkyl acrylamides, the acrylic esters of saturated aliphatic monohydric alcohols and the vinyl esters of saturated aliphatic monocarboxylic acids. The copolymerizable materials are mixed in proportions such that the resulting copolymer has an average of at least two isocyanate groupings per molecule. Such a product is obtained when the mixture contains, by weight, for instance, from about 3 to 30% of the primary isocyanate, e. g., allyl isocyanate, methallyl isocyanate, etc., and from about 97 to 70% of the other copolymerizable monomer, e. g., N,N-dibutyl acrylamide, ethyl acrylate, vinyl acetate, etc.

The mixed ingredients are copolymerized under anhydrous conditions. Copolymerization may be effected, for example under the influence of ultraviolet light, with or without heat and with or without a catalyst such, for instance, as benzoyl peroxide or other organic peroxide which is free from a hydrogen atom or atoms that would react with the isocyanate grouping. If desired, the mixed ingredients may be copolymerized in solution state, for instance, in solution in an inert organic solvent, e. g., toluene, benzene, xylene, dioxane, ethers (e. g., dibutyl ether), esters (e. g., butyl acetate), chlorobenzene, ethylene dichloride, ketones (e. g., methyl ethyl ketone), etc. The temperature of copolymerization may be varied as desired or as conditions may require, but ordinarily will be within the range of from about 20° to about 150° C. when copolymerization is effected in the absence of a solvent. When the mixed ingredients are copolymerized in solution state, then copolymerization generally is effected at the boiling temperature of the solution. In all cases, the temperature of copolymerization is below the decomposition temperature of the monomeric materials.

In copolymerizing the primary isocyanate with the other copolymerizable monomer we prefer to use heat and a catalyst which is free from hydrogen or other groups reactive with the isocyanate grouping, e. g., benzoyl peroxide, di-(tertiary-butyl) peroxide, acetyl peroxide, etc., since thereby we are better able to obtain soluble copolymers. When such a soluble copolymer is exposed to light, insolubilization occurs. This reaction appears to take place through the direct polymerization of the isocyanate grouping. It is possible to effect insolubilization by exposing the copolymer to the action of ultraviolet light or by long exposure to diffused daylight. When the copolymerization is conducted under conditions involving ultraviolet light and a peroxide, both soluble and partially soluble copolymers may be produced. By proper selection of the polymerization conditions it is possible to obtain, at will, soluble or insoluble materials. In order to preserve soluble copolymers which are suitable for reaction with hydrogen-donor materials its is preferable to store such copolymers or solutions of the same in the absence of light. On the other hand, it is possible to obtain an insoluble film of copolymer by exposing a film of the soluble copolymer to the action of ultraviolet light or, for a longer period, to the action of diffused light.

As pointed out hereinbefore, it is advisable during the copolymerization to avoid the use of any compounds which are capable of reacting with the isocyanate grouping, e. g., alcohols, acids, water, etc. In the case of the high molecular weight copolymers it has been found that after dissolving them in an organic liquid which is insoluble in water, it is possible to form an emulsion of the organic solution of the copolymeric isocyanate. The presence of the organic liquid appears to act as a barrier to prevent water from coming into contact with the copolymeric isocyanate. In order further to impede the transfer of liquid water and water vapor, one can introduce into the initial solution or dispersion a small amount (e. g., from about 0.1 to 10% by weight of the copolymer) of a material which is known to impede the transfer of water vapor, for example, polyethylene, crystalline products such as paraffin, microcrystalline waxes, etc.

The isocyanate copolymer composition may be applied to the hydrogen-donor textile material in any suitable manner. The textile material may be contacted with a liquid copolymer in undiluted state or the copolymer may be applied in the form of a solution or dispersion thereof. In all cases the amount of copolymer which is deposited or incorporated in the textile material, e. g., wool or a wool-containing textile, is at least about 1% by weight based on the dry weight of the textile material. The amount will vary depending, for instance, upon the particular textile undergoing treatment, the particular copolymer employed, the mode of application, the kind of emulsifying agent used if applied from dispersion, etc. Ordinarily, however, the amount of copolymer that is incorporated in the textile material for coating applications is from about 3 to 15% by weight of the dry, untreated material. The use of a higher percentage proportion of copolymer, e. g., as much as 100% or more by weight of the material being treated, is not precluded since for some applications, e. g., where the copolymer is used as a binder in the production of laminated articles, the use of a relatively high amount of copolymer of the order aforementioned may be desirable. (In making such laminated articles sheets of the textile material impregnated with the copolymer are superimposed and bonded together under heat and pressure.) However, with wool and most other organic, hydrogen-donor textile materials, the untreated material is impregnated under conditions such that the final article or product has chemically bound therein from about 1 to 15%, more particularly from about 3 to 15%, by weight of the untreated material, of the hereindescribed isocyanate copolymer. A more specific example of such a copolymer is one that is the product of copolymerization of a mixture of, by weight, about 3 to 30% of allyl isocyanate and from about 97 to 70% of an acrylic ester of a saturated monohydric alcohol, more particularly a mixture of, by weight, from about 5 to 20% of allyl isocyanate and from about 95 to 80% of ethyl acrylate. When, for example, wool or a wool-containing material in fabric or other textile form is thus impregnated, there is obtained a product of outstanding properties as compared with the untreated material, for instance, in such properties as resistance to shrinking and creasing and in its lack of harshness, that is, in its soft feeling to the touch.

If the textile material to be treated contains fats, oils or other contaminants, it is first thoroughly cleaned in any suitable manner prior to treatment with the isocyanate copolymer. Various methods may be used in applying the copolymer. For example, the dry textile material may be immersed and passed through suitable rolls, as in a padder or mangle, to insure uniform impregnation and to remove excess copolymer. However, the textile material may be impregnated by other methods, for example, by spraying or by brushing a solution or dispersion of the copolymer upon the material or by applying thereto a liquid copolymer in undiluted state. Or, the solid copolymer itself may be combined with the textile material as by passing a sheet or cloth of the same, having thereon or therein the copolymer in finally divided solid state, between hot rolls. The impregnating operation and the concentration of the copolymer (in solution, dispersion or other state) are adjusted so that the amount of copolymer which is taken up by the textile material will be most effective and economical in producing the desired results.

In the treatment of polysaccharide-containing textile materials, specifically cotton fabric, with an emulsion of the isocyanate copolymer, the use of an anionic emulsion results in the deposition of substantially the same amount of copolymer on the fabric that is in the emulsion. An exhausting type of bath, which is preferred, is provided for treating cotton and similar polysaccharide materials by using a cationic emulsion. In the treatment of wool and similar protein-containing textiles, an anionic emulsion is used when the pH is less than about 4 in order to obtain an exhausting type of bath, whereas when the pH is above about 5 a cationic emulsion is employed to secure the same type of bath since, in the case of wool, the charge is changed by the wool as a function of pH.

If the copolymer has been applied in dissolved or dispersed state to the textile material, the treated textile is heated to volatilize the inert, volatile organic liquid (if the copolymer was applied as a solution thereof) or to volatilize the water and the inert organic liquid (if the copolymer was applied in the form of an inert organic liquid-water dispersion) and, also, to effect reaction between the textile material and the copolymer, thereby insolubilizing the latter in situ. Any suitable elevated temperature may be employed, but in no case should the temperature be so high as to char or otherwise detrimentally affect the textile material. For instance, with most textiles temperatures within the range of about 200 to 300° F. may be used. Ordinarily, temperatures at or slightly above the boiling point of water or of the particular inert organic liquid employed are sufficient to effect the desired result. Of course, it will be understood by those skilled in the art that there is a time-temperature relationship involved: the lower the temperature the longer the time of heating, and the higher the temperature the shorter the heating period. The temperature also will vary somewhat with, for instance, the particular textile which has been treated and the particular isocyanate copolymer employed. For example, higher temperatures generally are desirable when using a solution or dispersion of an isocyanate copolymer composition containing an aromatic ring structure since such copolymers usually show a more marked viscosity-response with an increase in temperature than do copolymers free from an aromatic ring structure.

After the textile material, e. g., wool fabric, has been treated as above described, it may be given, if desired or necessary, a mild soaping for a short period before finishing. The textile material then may be given the usual finishing treatments required in a particular case, e. g., decatizing, brushing, shearing, pressing, etc.

In order that those skilled in the art better may understand how the present invention may be carried into effect, the following examples are given by way of illustration and not by way of limitation. All parts are by weight.

*Example 1*

| | Parts |
|---|---|
| Ethyl acrylate | 45.0 |
| Allyl isocyanate | 5.0 |
| Benzoyl peroxide | 0.2 | were mixed together and placed in a quarts flask inclined and fitted with a 3-way adapter. A reflux condenser was attached to the vertical joint of the adapter and a gas delivery tube was attached to the adapter joint opposite from the flask. A slow stream of dry carbon dioxide was passed through the flask during the course of the reaction. The flask was irradiated from below, thus directly on the reaction mass, with a small laboratory size Mico ultraviolet lamp, the lamp being mounted about 1½ inches from the flask.

Irradiation of the catalyzed mixture of monomers was continued for 162 hours. At the end of this time, the ethyl acrylate and allyl isocyanate had copolymerized to a clear mass which, although soft, had little tendency to flow.

When the polymeric mass was dissolved in dry toluene, most of it went into solution. However, part of the copolymer, although it swelled highly, did not dissolve. Apparently, a certain amount of cross-linking occurred during the polymerization reaction. When a small portion of the toluene solution was treated with a few drops of ethylene diamine, gelation occurred almost immediately. Similarly, when a small portion of the toluene solution was treated with p-phenylene diamine, although no reaction occurred immediately, warming on the steam bath for several minutes was sufficient to cause gelation. This illustrates the high degree of reactivity of the copolymer.

Twelve parts of the above solution which contained about 30%, by weight, of copolymer, was diluted with 68 parts of dry toluene to give 80 parts of a solution containing about 5%, by weight, of copolymer. Two pieces of cotton poplin were then treated directly with this solution. The pieces of fabric were immersed in the solution for about 10 to 15 seconds, squeezed out and allowed to air-dry until all the solvent had evaporated. One piece of the treated cloth was then heated in an oven at 120° C. for 4 minutes. The second piece of treated cloth was heated in an oven at 120° C. for 7 minutes. A third piece of the poplin, which had been pre-dried by heating in the oven at 100° C. for about 40 minutes, was also treated with the copolymer solution and, after air-drying, was given a heat treatment at 120° C. for 4 minutes.

When compared with a piece of untreated poplin, all three of the treated pieces were stiffer and were somewhat more crease-resistant than the untreated cloth. When compared for water repellency, all three pieces of the treated cloth were definitely superior to the untreated cloth.

A piece of woolen goods was treated with a toluene solution containing about 10% by weight of the copolymer of this example. The wool sample (9" x 23" in size) was immersed in the solution, and passed through squeeze rolls to give 80-90% wet pick-up (8-9% solids). The sample was framed, air-dried for a short period, and then heated for 9 minutes at 290° F. After cooling to room temperature, the sample was removed from the frame, allowed to remain undisturbed for about 16 hours and was then measured prior to laundering. The method of laundering was a modification of the standard method of the A. A. T. C. C., and involved heating for 20 to 30 minutes at 240° F. while drying after each washing. After a cycle of 5 washing (10 minutes in soap solution) and drying operations, and a final washing of 1 hour in the soap solution, the dried treated cloth showed a shrinkage of only 3.9%. In marked contrast, untreated woolen cloth when similarly laundered for the same number of times showed a shrinkage of 44.5%. After 15 washing and drying cycles, the shrinkage was only 4.2%. The laundered cloth had a soft hand.

Cotton goods treated with the above 10% copolymer solution was found to have 100% retention to soaping and dry cleaning.

The copolymer of this example imparts a good degree of crease resistance to fabric materials, e. g., rayon. Thus, when a sample of rayon was treated with a 10% toluene solution of the copolymer, the treated rayon showed a crease-resistance value of 6.7, whereas the crease-resistance value of the untreated rayon was 5.1 (Tootal, Broadhurst and Lee standard method of determining crease resistance).

Similar results are obtained when methallyl isocyanate is substituted for allyl isocyanate in the above formula and the resulting copolymer is used as hereinbefore described.

Example 2

| | Parts |
|---|---|
| Butyl acrylate | 90.0 |
| Allyl isocyanate | 10.0 |
| Benzoyl peroxide | 0.4 |
| Toluene (dry) | 33.0 |

The toluene was placed in a flask and heated under reflux while maintaining a bath temperature of 130 to 135° C. The mixture of the other ingredients was added dropwise over a period of 23 minutes. Heating was continued under reflux for a period of 3 hours. One hundred parts of dry toluene was then added, after which about 115 parts of solvent was distilled off at reduced pressure on a steam bath in order to remove any unreacted monomers. The resulting material was diluted with 225 parts dry toluene, yielding a solution containing about 86.6 parts (approximately 38.5% by weight) of copolymer. When a small portion of this solution was treated with 2 to 3 drops of ethylene diamine, gelation occurred almost immediately upon stirring the mixture. One hundred and eighty-two (182) parts of the 38.5% solution was thinned with additional toluene to yield a solution containing about 10% by weight of copolymer. This solution was used in treating wool as described under Example 1. After a cycle of 5 washing and drying operations, and a final washing of 1 hour in the soap solution, the dried, treated piece of wool showed a shrinkage of 5.8%. After 15 washing and drying cycles, the shrinkage was 6.7%. The treated cloth had a soft hand.

The substitution of methallyl isocyanate for allyl isocyanate in the above formula yields a copolymer which gives similar results when used as hereinbefore described.

Example 3

| | Parts |
|---|---|
| Butyl acrylate | 90.0 |
| Allyl isocyanate | 10.0 |
| Benzoyl peroxide | 0.4 | were mixed together and subjected to ultraviolet light while the mixture was exposed to an atmosphere of carbon dioxide. After exposure for about 2 hours, an increase in the viscosity of the solution was noted. After 18 hours' exposure, the mixture was clear, very viscous but still flowed. After a total of 90 hours' exposure, during which time the flask occasionally was rotated so that a new surface was exposed to the light, a clear polymeric mass was obtained which had no appreciable flow when the flask was tipped. One hundred parts of dry toluene was mixed with the copolymer produced as above described and allowed to stand for about 3 days. Some of the copolymer dissolved in the toluene, but the greater part of it was in a highly swollen but insoluble gel state. This was apparently due to cross-linking brought about by the allyl isocyanate during the polymerization. The soluble portion of the material was decanted and the gel that remained was then twice extracted with additional toluene. This solution may be used in treating cotton, wool, rayon, silk, etc., to improve their properties.

Four pieces of muslin were impregnated 3 times with a toluene solution containing about 15% by weight of the above-described butyl acrylate-allyl isocyanate copolymer, the pieces being air-dried after each impregnation. The impregnated sheets were superimposed, and laminated by heating between steel plates for 8 minutes at 125 to 130° C. under a pressure of approximately 50 pounds per square inch. A flexible, well-bonded laminated sheet was obtained. Cross-linking of the copolymer occurred during curing.

Example 4

Same formula as in the preceding example. Ultraviolet radiation was applied to the mixed ingredients in a quartz flask under anhydrous conditions using a small Mico ultraviolet lamp placed about 1½ inches from the flask. After 75 minutes' treatment, a slight but definite increase in viscosity was noted. After about 31 hours' total irradiation, 100 parts of dry toluene was added to the resulting copolymer, but the solid copolymer did not completely dissolve in the toluene even after standing for about 6 days. An additional 100 parts of dry toluene was now added and dissolution of the copolymer therein was hastened by shaking the container. An appreciable amount of highly swollen, gelled copolymer was present in the mass, but the amount thereof was considerably less than that resulting from the preceding example. The solution was strained to remove gel particles, and additional dry toluene was added to yield a solution containing about 20.8% by weight of copolymer. Three hundred parts of the resulting solution was transferred to a one-liter flask and part of the solvent was distilled off at reduced pressure to remove any unreacted monomers. The solution was then diluted with additional dry toluene to form a solution containing about 10% by weight of copolymer. This solution was used in treating wool as described under Example 1. After a cycle of 5 washing and drying operations, and a final washing of 1 hour in the soap solution, the dried, treated piece of wool showed a shrinkage of 4.2%. After 15 washing and drying cycles, the shrinkage was 5.3%. The treated cloth had a soft feeling to the touch.

Example 5

| | Parts |
|---|---|
| Ethyl acrylate | 95.0 |
| Allyl isocyanate | 5.0 |
| Benzoyl peroxide | 0.4 |
| Toluene (dry) | 67.0 |

The same procedure was followed as described under Example 2 with the exception that the temperature of the bath was 140 to 145° C. The mixture of ethyl acrylate, allyl isocyanate and benzoyl peroxide was added dropwise to the toluene over a period of 40 minutes. Heating was continued under reflux for an additional period of 4 hours. Thereafter 250 parts of dry toluene was added to the mass, after which about 100 parts of solvent was distilled off at reduced pressure in order to remove any unreacted monomers. Two hundred and forty parts of the resulting solution was diluted with 460 parts of dry toluene to yield a solution containing about 10% by weight of copolymer. This solution was used in treating wool as described under Example 1. The shrinkage after a cycle of 5 washing and drying operations, and a final washing of 1 hour in the soap solution followed by drying, was 5.8%. After 15 washing and drying cycles, the shrinkage was 7.2%. The treated wool had a soft hand.

Example 6

| | Parts |
|---|---|
| Ethyl acrylate | 135.0 |
| Allyl isocyanate | 15.0 |
| Benzoyl peroxide | 0.6 |

Essentially the same procedure was followed as described under Example 1 with the exception that the ultraviolet lamp was mounted about 1 inch from the flask. After 24 hours' irradiation, a clear, firm mass of copolymer was obtained. One hundred parts of dry toluene was added to the copolymer composition, and after standing for about 6 days another 150 parts of toluene was added thereto. The solution was strained after standing for another 6 days in order to remove undissolved gel particles. The strained solution contained about 32% by weight of copolymer. One hundred parts of this solution was diluted with dry toluene to form a solution containing about 20% by weight of coypolmer. This solution was emulsified by adding its slowly to an equal amount of water containing about 1% by weight of the sodium salt of the sulfate of a mixture of lauryl and myristyl alcohols, while violently agitating the mixture. This emulsion is later referred to herein as Sample A. Another portion of the copolymer solution was diluted with an additional amount of toluene to yield a solution containing about 10% by weight of copolymer. This solution is later referred to herein as Sample B.

Samples A and B were used in treating an organic fabric material specifically wool, as described under Example 1. After a cycle of 5 washing and drying operations, and a final washing of 1 hour in the soap solution, the dried piece of wool which had been treated with Sample A showed a shrinkage of 4.4% while the wool which had been treated with Sample B showed a shrinkage of 2.8%. After 15 washing and drying cycles, the shrinkage of the wool treated with Sample A was 8.0% and that which had been treated with Sample B, 4.2%. In both cases the treated woolen fabric had a soft hand.

Example 7

| | Parts |
|---|---|
| N-butyl acrylamide | 18.0 |
| Allyl isocyanate | 2.0 |
| Benzoyl peroxide | 0.08 |

The N-butyl acrylamide and allyl isocyanate were mixed together and added to a Pyrex glass vessel to which the catalyst previously had been added. The mixture was blanketed with carbon dioxide, and the container was stoppered until ready for sealing. Thereafter it was cooled in Dry Ice and sealed while evacuating with a water pump, flushing out the container 4 or 5 times with carbon dioxide before sealing. Although the catalyst dissolved only partly in the mixture of monomers, the mixture polymerized rapidly upon standing at room temperature. After about 96 hours the mixture had partly solidified. After standing for about 24 days the copolymer was obtained in the form of a clear, solid mass which swelled but did not dissolve in dioxane. This copolymer may be used, for example, in the production of molded articles. Since N-butyl acrylamide is a compound containing a hydrogen atom capable of reacting with the isocyanate grouping of the allyl isocyanate, this example illustrates the results that are obtained when such a material is copolymerized with a primary isocyanate of the kind with which this invention is concerned, specifically allyl isocyanate.

When N,N-dibutyl acrylamide is substituted for N-butyl acrylamide in the above formula, a copolymer is obtained which is soluble in various inert liquids, e. g., toluene, etc. Such soluble copolymers are suitable for use in treating organic fabric materials, e. g., cotton, wool, rayon, silk, etc., to impart improved properties thereto.

Example 8

| | Parts |
|---|---|
| Ethyl acrylate | 40.0 |
| Allyl isocyanate | 10.0 |
| Benzoyl peroxide | 0.2 | were mixed together in a quartz flask and exposed to ultraviolet light under the same conditions as described under Example 1. After 65 hours the flask was rotated partly to expose a new surface to the light. Exposure was continued for a total of 161 hours, the ethyl acrylate and the allyl isocyanate having copolymerized at the end of this time to a clear, soft, sticky mass which had no appreciable flow.

Seventy-five parts of dry toluene was added to the flask and the copolymer was dissolved by first warming the mixture on a steam bath and then allowing it to stand at room temperature for about 3 days. An additional 25 parts of dry toluene was now added. A somewhat higher proportion of swollen but insoluble gelled polymer appeared to be present than was obtained in Example 1. The solution was strained to remove the gel particles, and the gel portion was then extracted with an additional 25 parts of dry toluene. One hundred and sixteen parts of solution containing 35 parts (approximately 30.1% by weight) of copolymer was obtained.

When a small portion of the above solution was treated with ethylene diamine, gelation occurred almost instantaneously. Similarly, when a small portion of the solution was treated with 2,2-dimethyl propanediol, although no reaction occurred immediately, heating in an oven at 100° C. for 10 to 15 minutes produced an insoluble, cross-linked copolymer.

Woolen goods were treated with a 10% solution of the copolymer as described under Example 1. The shrinkage after a cycle of 5 washing and drying operations and a final washing of 1 hour followed by drying was 4.2%. The treated wool had a soft hand.

It will be understood, of course, by those skilled in the art that our invention is not limited to the use of isocyanate copolymers prepared from the specific ingredients named in the above illustrative examples nor to the particular proportions there shown. Thus, instead of allyl isocyanate we may use, for instance, methallyl isocyanate, 3-butenyl isocyanate, p-vinylbenzyl isocyanate or any other primary isocyanate or mixture thereof embraced by the general formula $$CH_2=CR-(A)_n-CH_2-NCO$$

where R, A and $n$ have the meanings given in the second paragraph of this specification, numerous examples of which isocyanates were hereinbefore given.

Likewise, monomeric materials other than those specified in the examples may be copolymerized with the primary isocyanate. For example, we may use methyl acrylate, propyl acrylate, hexyl acrylate, methyl methacrylate, ethyl methacrylate, vinyl acetate, allyl acetate, acrylonitrile, methacrylonitrile or any other compound which is copolymerizable with the isocyanate, which contains a single $CH_2=C<$ grouping, and which is free from a hydrogen atom or atoms reactive with the isocyanate grouping, numerous examples of which compounds previously have been given. If desired, mixtures of monomers may be copolymerized with a single isocyanate or with a plurality of isocyanates.

Catalysts other than benzoyl peroxide also may be employed, but if a catalyst is used it is desirable to use one which contains no hydrogen atom or atoms that will react with the isocyanate grouping. Examples of catalysts that may be employed are inorganic peroxides such, for example, as barium peroxide, etc.; dialkyl peroxides, e. g., lauryl peroxide, stearyl peroxide, di-(tertiary-butyl) peroxide, etc.; symmetrical diacyl peroxides, e. g., acetyl peroxide, lauroyl peroxide, stearoyl peroxide, etc.; unsymmetrical or mixed diacyl peroxides, e. g., acetyl benzoyl peroxide, etc. Any suitable amount of catalyst may be used, but in general the catalyst concentration will be within the range of about 0.05 to 2 or 3% by weight of the mixed copolymerizable materials. If desired, additional catalyst of a suitable nature may be added to the liquid, dissolved or dispersed copolymer prior to application to the textile material.

The proportions of the copolymerizable ingredients may be varied over a wide range, but in all cases the proportions are such that the resulting polymerization product has an average of at least two isocyanate groupings per molecule. Particularly useful copolymer compositions are obtained when the mixture of copolymerizable materials contains, by weight, from about 3 to 30% of the primary isocyanate and from about 97 to 70% of the other copolymerizable monomer. In producing soluble copolymers for use in treating wool and various other textile materials, we prefer to use a mixture of, by weight, about 5 to 15% of the primary isocyanate and about 95 to 85% of the other copolymerizable monomer. When the copolymer is used in such applications no particular advantage ordinarily accrues when the isocyanate is used in an amount much above about 15%, by weight, of the mixed ingredients. Good results have been obtained with copolymers produced from a mixture of, by weight, about 10% of the primary isocyanate and about 90% of the other copolymerizable monomer. For some applications it may be desirable to use the isocyanate in an amount substantially exceeding 30%, by weight, of the mixed ingredients, but in general the isocyanate will constitute a lesser or minor proportion and the other monomeric material a greater or major proportion, by weight, of the mixed copolymerizable materials.

Illustrative examples of organic, hydrogen-donor textile materials (in thread, yarn, fabric or other form) which may be treated with the above-described copolymers to impart improved properties thereto are polysaccharide-containing textiles, for instance those formed of or containing cellulose or regenerated celluloses, e. g., cotton, linen, hemp, jute, ramie, sisal, cellulose acetate rayons, viscose rayons, cuprammonium rayons, etc.; mixtures of such polysaccharide-containing textiles; protein-containing textiles, for instance those formed of or containing wool, silk, mohair, fur, leather, regenerated protein fibers or fabrics, e. g., those produced from casein, soyabean, collagen, etc.; mixtures of such protein-containing textiles; mixtures of polysaccharide-containing and protein-containing textiles such as those mentioned above by way of illustration; textiles formed of or containing synthetic resins having —OH groups in the molecule, e. g., alkyd resins containing —OH groups, polyvinyl alcohol and partially esterified and etherified polyvinyl alcohols, etc; synthetic silk, e. g., nylon, polyurethanes, etc.; mixtures of nylon or other synthetic silk with a rayon or with other materials such as aforementioned; and mixtures of synthetic resins containing —OH groups with nylon, polyurethanes, rayons or with any of the other materials named above. The isocyanate copolymer also may be used in treating textile material containing absorbed or combined water or having a thin film of water adsorbed on its surface, e. g., glass, asbestos, etc., in fiber, fabric, felted or other form and having water therein or thereon. The water reacts with the isocyanate copolymer and insolubilizes the latter in situ.

Illustrative examples of inert, volatile, organic liquids (that is, volatile, organic liquids which are non-reactive with the isocyanate copolymer composition) which may be used, if the copolymer is to be applied in solution state or in the form of an inert organic liquid-water dispersion to the textile material, are benzene, toluene, xylene, dioxane, ethers (e. g., di-isopropyl ether, dibutyl ether, etc.), esters (e. g., butyl acetate, etc.), chlorinated hydrocarbons, for instance carbon tetrachloride, trichloroethylene, ethylene dichloride, chlorobenzenes (e. g., 1,3-dichlorobenzene, etc.), ketones (e. g., methyl ethyl ketone, etc.), petroleum naphtha, etc. If applied in an inert organic liquid-water dispersion, the inert organic liquid is one which is immiscible with the water.

If the copolymer is to be applied to the textile material in the form of a dispersion, specifically an inert organic liquid-water dispersion, any suitable emulsifying agent may be employed, e. g., the sodium salt of the sulfate of a mixture of lauryl and myristyl alcohols, dioctyl sodium sulfo-succinate, sodium salts of alkylaromatic sulfonic acids (e. g., the sodium salt of isopropylnaphthalene sulfonic acid), quaternary ammonium salts (e. g., cetyl dimethyl ammonium chloride), etc. However, the emulsion or dispersion should be such that the isocyanate copolymer is adequately protected in the dispersion from the action of the water. In such an emulsion or dispersion the proportions of water and inert organic liquid may be varied as desired or as conditions may require, for example from, by volume, about 25 to 75 parts water to about 75 to 25 parts inert, volatile organic liquid. The amount of copolymer, based on the total amount of water and inert organic liquid may vary considerably, e. g., from about 5 to 20% or more by weight of the total weight of the water and inert organic liquid. Good results have been obtained using a solution containing about 20% by weight of the isocyanate copolymer (e. g., an allyl isocyanate-ethyl acrylate copolymer) dissolved in an inert, volatile organic liquid, specifically toluene, which solution was then emulsified with about an equal weight of water using about 0.5%, by weight of the total water and toluene, of the sodium salt of the sulfate of a mixture of lauryl and myristyl alcohols as an emulsifying agent. The amount of emulsifying agent may be varied considerably, but ordinarily will be within the range of from about 0.5 to 10% by weight of the copolymer in the dispersion.

Our process may be applied in the treatment of colored textile materials as well as whites. In the treatment of colored materials the isocyanate copolymer has the particular advantage over conventional treating agents in that it more firmly anchors the dye therein and eliminates "crocking." Another advantage of the process is that it imparts additional strength to the treated textile.

The isocyanate copolymer may be applied alone to the textile material or it may be applied in combination with other modifying agents, numerous examples of which are given in our copending application Serial No. 694,156. If desired, the copolymer may be used to supplement or in combination with conventional treating agents in the treatment of textiles to impart improved properties thereto.

Thus, it is possible to pretreat, for example, a natural fiber or other textile material with a solution of a resin having a plurality of hydroxyl groups in the molecule (e. g., alkyd resins containing —OH groups, polyvinyl alcohol and partially esterified and etherified polyvinyl alcohols, etc.) and then to insolubilize the hydroxyl-containing resin by reaction with the isocyanate copolymer.

The terms "textile" and "textile material" as used generally herein and in the appended claims include within their meaning filaments, fibers, threads, yarns, etc., as such or in woven, felted or otherwise formed fabrics, sheets, cloths and the like. "Hydrogen-donor" material as used herein and in the appended claims has the meaning commonly understood by those skilled in the art, more particularly a material containing a hydrogen atom or atoms replaceable by sodium. The hydrogen-donor materials which we use in practicing our invention in all cases are reactive with the isocyanate copolymer.

What we claim as new and desire to secure by Letters Patent of the United States is:

1. A process of treating hydrogen-donor textile material to improve the properties thereof which comprises (1) treating said textile material with a composition comprising a reactive product of polymerization of a polymerizable mixture including (a) a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (b) a different organic compound which is copolymerizable with the isocyanate of (a), which contains a single $CH_2=C<$ grouping, and which is free from a hydrogen atom reactive with the isocyanate grouping, the proportions of the said ingredients of (a) and (b) in the said mixture being such that the said polymerization product contains an average of at least two isocyanate groupings per molecule, and (2) heating the resulting treated material to effect reaction between the said textile material and the said polymerization product, thereby insolubilizing the latter.

2. A process as in claim 1 wherein the primary isocyanate of (a) is allyl isocyanate.

3. A process as in claim 1 wherein the organic compound of (b) is an acrylic ester of a saturated monohydric alcohol.

4. A process as in claim 1 wherein the hydrogen-donor textile material is a protein-containing textile material.

5. A process as in claim 1 wherein the hydrogen-donor textile material is a polysaccharide-containing textile material.

6. A process of reducing the felting and shrinking tendencies of wool-containing textile material which comprises (1) impregnating such a material with an inert, volatile organic liquid-water dispersion of a reactive product of polymerization of a mixture containing, by weight, (a) from about 3 to 30% of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (b) from about 97 to 70% of a different organic compound which is copolymerizable with the isocyanate of (a), which contains a single $CH_2=C<$ grouping, and which is free from a hydrogen atom reactive with the isocyanate grouping, the take-up of the said dispersion being such as to deposit in the textile material at least about 1% by weight, based on the dry weight of the textile material, of the said polymerization product, and (2) heating the resulting treated material to volatilize the water and the organic liquid from the said dispersion and to effect reaction between the said textile material and the said polymerization product, thereby insolubilizing the latter.

7. A process of reducing the felting and shrinking tendencies of wool-containing textile material which comprises (1) impregnating such a material with a solution of a soluble copolymer dissolved in an inert, volatile organic liquid, said copolymer being the product of polymerization of a mixture containing, by weight, (a) from about 3 to 30% of a primary isocyanate represented by the general formula $$CH_2=CR-(A)_n-CH_2-NCO$$

where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (b) from about 97 to 70% of a different organic compound which is copolymerizable with the isocyanate of (a), which contains a single $CH_2=C<$ grouping, and which is free from a hydrogen atom reactive with the isocyanate grouping, the take-up of the solution being such as to deposit in the textile material at least about 1% by weight, based on the dry weight of the textile material, of the said soluble copolymer, and (2) heating the resulting treated material to volatilize the said organic liquid and to effect reaction between the said textile material and the said polymerization product, thereby insolubilizing the latter.

8. A process of treating organic, hydrogen-donor textile material to improve the properties thereof which comprises (1) treating said textile material with a composition comprising a reactive product of polymerization of a mixture containing, by weight, from about 3 to 30% of allyl isocyanate and about 97 to 70% of an acrylic ester of a saturated monohydric alcohol, and heating the resulting treated material at a temperature within the range of about 200 to 300° F. to effect reaction between the said organic textile material and the said polymerization product, thereby insolubilizing the latter.

9. Hydrogen-donor textile material impregnated and chemically bound with a product of polymerization of a polymerizable mixture including (1) a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent aromatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (2) a different organic compound which is copolymerizable with the isocyanate of (1), which contains a single $CH_2=C<$ grouping, and which is free from a hydrogen atom reactive with the isocyanate grouping, the proportions of the said ingredients of (1) and (2) in the said mixture being such that the said polymerization product contains an average of at least two isocyanate groupings per molecule.

10. A material as in claim 9 wherein the hydrogen-donor textile material is a protein-containing textile material.

11. A material as in claim 9 wherein the hydrogen-donor textile material is a polysaccharide-containing textile material.

12. A wool-containing textile material which is resistant to shrinking and which is impregnated and chemically bound with at least 1%, by weight of the untreated material, of a copolymer which is the product of polymerization of a mixture containing, by weight, (1) from about 3 to 30% of a primary isocyanate represented by the general formula $CH_2=CR-(A)_n-CH_2-NCO$ where R represents a member of the class consisting of hydrogen and the methyl radical, A represents a member of the class consisting of divalent saturated aliphatic hydrocarbon radicals, divalent saturated aliphatic-substituted aromatic hydrocarbon radicals and divalent aromatic-substituted saturated aliphatic hydrocarbon radicals, and $n$ represents a value selected from the class consisting of 0 and 1, the methylene radical attached to the isocyanate grouping being attached directly, when $n$ is 1, to any carbon atom of the divalent radical represented by A, and (2) from about 97 to 70% of a different organic compound which is copolymerizable with the isocyanate of (1), which contains a single $CH_2=C<$ grouping, and which is free from a hydrogen atom reactive with the isocyanate grouping.

13. A woolen fabric material which is resistant to creasing and shrinking, has a soft feeling to the touch and which is impregnated and chemically bound with about 3 to 15%, by weight of the untreated material, of a copolymer which is the product of polymerization of a mixture of, by weight, from about 3 to 30% of allyl isocyanate and from about 97 to 70% of an acrylic ester of a saturated monohydric alcohol.

14. Shrink-resistant wool which has a soft feeling to the touch and which is impregnated and chemically bound with about 3 to 15%, by weight of the untreated material, of a copolymer which is the product of polymerization of a mixture of, by weight, from about 5 to 20% of allyl isocyanate and from about 95 to 80% of ethyl acrylate.

15. A shrink-resistant woolen fabric material which has a soft feeling to the touch and which is impregnated and chemically bound with from about 3% to about 15%, by weight of the untreated material, of a copolymer which is the product of polymerization of a mixture of co-monomers consisting of, by weight, about 10% of allyl isocyanate and about 90% of ethyl acrylate.

EDWARD L. KROPA.
ARTHUR S. NYQUIST.

REFERENCES CITED

The following references are of record in the file of this patent:

UNITED STATES PATENTS

| Number | Name | Date |
|---|---|---|
| 2,054,131 | Kollek | Sept. 15, 1936 |
| 2,173,029 | Waltmann | Sept. 12, 1939 |
| 2,326,287 | Coffman | Aug. 10, 1943 |
| 2,327,985 | Alderman | Aug. 31, 1943 |
| 2,334,476 | Coffman | Nov. 16, 1943 |
| 2,335,582 | Coffman | Nov. 30, 1943 |
| 2,343,095 | Smith | Feb. 29, 1944 |
| 2,406,412 | Speakman | Aug. 27, 1946 |
| 2,406,454 | Charlton | Aug. 27, 1946 |
| 2,468,716 | Nyquist et al. | Apr. 26, 1949 |

OTHER REFERENCES

Barr et al.: "The Use of Polymers to Make Wool Unshrinkable," part II, "Diisocyanates," J. Soc. Dyers and Colourists, Nov. 1946, pages 338–345.

Certificate of Correction

Patent No. 2,537,064

January 9, 1951

EDWARD L. KROPA ET AL.

It is hereby certified that error appears in the printed specification of the above numbered patent requiring correction as follows:

Column 5, line 43, for "Vinylbiphenylmethyl" read *Vinylbiphenylylmethyl*; line 44, for "Isopropenylbiphenylmethyl" read *Isopropenylbiphenylylmethyl*; column 6, line 1, for "phenlethyl" read *phenylethyl*; column 7, line 27, for "its" read *it*; column 9, line 52, for "quarts" read *quartz*; column 13, line 16, for "its" read *it*; column 14, line 71, for "$CH_2 \equiv C<$" read $CH_2 = C<$;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*